United States Patent
Brown et al.

(10) Patent No.: US 9,325,647 B2
(45) Date of Patent: *Apr. 26, 2016

(54) MESSAGE-HANDLING SERVER AND METHOD FOR HANDLING SECURE MESSAGE ATTACHMENTS FOR A MOBILE DEVICE

(71) Applicant: BlackBerry Limited, Waterloo (CA)

(72) Inventors: Michael Kenneth Brown, Fergus (CA); Neil Patrick Adams, Waterloo (CA); Michael Stephen Brown, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 5 days.

This patent is subject to a terminal disclaimer.

(21) Appl. No.: 14/100,994

(22) Filed: Dec. 9, 2013

(65) Prior Publication Data

US 2014/0115665 A1    Apr. 24, 2014

Related U.S. Application Data

(63) Continuation of application No. 13/285,548, filed on Oct. 31, 2011, now Pat. No. 8,607,326, which is a continuation of application No. 10/805,932, filed on Mar. 22, 2004, now Pat. No. 8,050,653.

(51) Int. Cl.
*H04L 29/06* (2006.01)
*H04L 12/58* (2006.01)
(Continued)

(52) U.S. Cl.
CPC ............ *H04L 51/08* (2013.01); *H04L 12/5895* (2013.01); *H04L 51/38* (2013.01);
(Continued)

(58) Field of Classification Search
None
See application file for complete search history.

(56) References Cited

U.S. PATENT DOCUMENTS 6,356,937 B1* 3/2002 Montville et al. ............ 709/206
6,397,261 B1 5/2002 Eldridge et al.
(Continued)

FOREIGN PATENT DOCUMENTS

EP    1580953 A1    9/2005
EP    1806683 A1    7/2007
(Continued)

OTHER PUBLICATIONS

Application as filed o f U.S. Appl. No. 11/859,980, filed Sep. 24, 2007.
(Continued)

*Primary Examiner* — Samson Lemma
*Assistant Examiner* — Abdulhakim Nobahar
(74) *Attorney, Agent, or Firm* — Thomas Grzesik; Fleit Gibbons Gutman; Bongini & Bianco P.L.

(57) ABSTRACT

A secure message that includes an attachment is received at a server. The secure message may have a secure layer that indicates that the secure message is at least digitally signed. The secure message may be provided without the attachment to the mobile device over a wireless network. A request may be received from the mobile device to access the attachment. The request may include an attachment identifier (ID) that identifies the attachment in accordance with a message-attachment indexing system. In response to the request to access the attachment, the server may perform an index lookup to find the attachment based upon the attachment ID, may look through the secure layer of the secure message in order to locate the attachment within the secure message, and may render at least an initial portion of the attachment by the server in a format for viewing by the mobile device.

21 Claims, 7 Drawing Sheets

(51) Int. Cl.
*H04W 12/02* (2009.01)
*H04W 12/10* (2009.01)

(52) U.S. Cl.
CPC ........ *H04L63/0435* (2013.01); *H04L 63/0442* (2013.01); *H04L 63/123* (2013.01); *H04W 12/02* (2013.01); *H04W 12/10* (2013.01)

(56) References Cited

U.S. PATENT DOCUMENTS

| | | | |
|---|---|---|---|
| 6,438,585 B2* | 8/2002 | Mousseau et al. | 709/206 |
| 6,795,924 B1 | 9/2004 | Kiessling et al. | |
| 8,050,653 B2 | 11/2011 | Brown et al. | |
| 8,607,326 B2 | 12/2013 | Brown et al. | |
| 2002/0023055 A1* | 2/2002 | Antognini et al. | 705/40 |
| 2002/0065042 A1* | 5/2002 | Picoult et al. | 455/41 |
| 2002/0199119 A1* | 12/2002 | Dunnion et al. | 713/201 |
| 2003/0031320 A1 | 2/2003 | Fan et al. | |
| 2003/0037261 A1* | 2/2003 | Meffert et al. | 713/201 |
| 2003/0055907 A1* | 3/2003 | Stiers | 709/206 |
| 2003/0115448 A1 | 6/2003 | Bouchard | |
| 2003/0158960 A1* | 8/2003 | Engberg | 709/237 |
| 2004/0054886 A1* | 3/2004 | Dickinson et al. | 713/153 |
| 2004/0117456 A1 | 6/2004 | Brooks et al. | |
| 2004/0205330 A1* | 10/2004 | Godfrey et al. | 713/150 |
| 2005/0054334 A1 | 3/2005 | Brown et al. | |
| 2005/0071632 A1* | 3/2005 | Pauker et al. | 713/165 |
| 2005/0114671 A1* | 5/2005 | Little et al. | 713/182 |
| 2005/0210289 A1 | 9/2005 | Brown et al. | |
| 2007/0123217 A1 | 5/2007 | Adams et al. | |
| 2007/0123307 A1 | 5/2007 | Adams et al. | |
| 2012/0159164 A1 | 6/2012 | Brown et al. | |

FOREIGN PATENT DOCUMENTS

| | | |
|---|---|---|
| WO | WO-0201373 A1 | 1/2002 |
| WO | WO-02101580 A1 | 12/2002 |
| WO | WO-03058483 A1 | 7/2003 |
| WO | WO-2004010661 A1 | 1/2004 |

OTHER PUBLICATIONS

Application as filed of U.S. Appl. No. 11/849,433, filed Sep. 4, 2007.
U.S. Appl. No. 10/805,932, Advisory Action mailed Feb. 5, 2010, 3 pgs.
U.S. Appl. No. 10/805,932, Advisory Action mailed Mar. 10, 2009, 3 pgs.
U.S. Appl. No. 10/805,932, Advisory Action mailed Dec. 20, 2007, 3 pgs.
U.S. Appl. No. 10/805,932, Examiner Interview Summary mailed Feb. 18, 2010, 3 pgs.
U.S. Appl. No. 10/805,932, Final Office Action mailed Jul. 13, 2007, 11 pgs.
U.S. Appl. No. 10/805,932, Final Office Action mailed Sep. 9, 2010, 15 pgs.
U.S. Appl. No. 10/805,932, Final Office Action mailed Sep. 25, 2007, 11 pgs.
U.S. Appl. No. 10/805,932, Final Office Action mailed Nov. 18, 2009, 13 pgs.
U.S. Appl. No. 10/805,932, Final Office Action mailed Dec. 23, 2008, 11 pgs.
U.S. Appl. No. 10/805,932, Non Final Office Action mailed Jan. 26, 2007, 9 pgs.
U.S. Appl. No. 10/805,932, Non Final Office Action mailed Apr. 14, 2010, 15 pgs.
U.S. Appl. No. 10/805,932, Non Final Office Action mailed May 14, 2008, 10 pgs.
U.S. Appl. No. 10/805,932, Non Final Office Action mailed Jun. 10, 2009, 12 pgs.
U.S. Appl. No. 10/805,932, Notice of Allowance mailed Jun. 24, 2011, 15 pgs.
U.S. Appl. No. 10/805,932, Response filed Jan. 19, 2010 to Final Office Action mailed Nov. 18, 2009, 10 pgs.
U.S. Appl. No. 10/805,932, Response filed Feb. 3, 2011 to Final Office Action mailed Sep. 9, 2010, 12 pgs.
U.S. Appl. No. 10/805,932, Response filed Feb. 17, 2010 to Advisory Action mailed Feb. 5, 2010, 10 pgs.
U.S. Appl. No. 10/805,932, Response filed Feb. 23, 2009 to Final Office Action mailed Dec. 23, 2008, 13 pgs.
U.S. Appl. No. 10/805,932, Response filed Mar. 25, 2008 to Final Office Action mailed Jul. 13, 2007, 13 pgs.
U.S. Appl. No. 10/805,932, Response filed Apr. 26, 2007 to Non Final Office Action mailed Jan. 26, 2007, 12 pgs.
U.S. Appl. No. 10/805,932, Response filed Aug. 16, 2010 to Non Final Office Action mailed Apr. 14, 2010, 10 pgs.
U.S. Appl. No. 10/805,932, Response filed Sep. 10, 2009 to Non Final Office Action mailed Jun. 10, 2009, 11 pgs.
U.S. Appl. No. 10/805,932, Response filed Sep. 15, 2008 to Non Final Office Action mailed May 14, 2008, 14 pgs.
U.S. Appl. No. 10/805,932, Response filed Nov. 23, 2007 to Final Office Action mailed Sep. 25, 2007, 16 pgs.
U.S. Appl. No. 13/285,548, Response filed Apr. 15, 2013 to Non Final Office Action mailed Jan. 15, 2013, 12 pgs.
U.S. Appl. No. 13/285,548, Non Final Office Action mailed Jan. 15, 2013, 11 pgs.
U.S. Appl. No. 13/285,548, Notice of Allowance mailed Aug. 2, 2013, 8 pgs.
"Chinese Application Serial No. 200510059074.3, Response filed Feb. 1, 2009 to First office action mailed Sep. 12, 2008", 9 pgs.
"European Application Serial No. 04006851.2, Non Final Office Action mailed Feb. 17, 2010", 3 pgs.
"European Application Serial No. 04006851.2, Non Final Office Action mailed Aug. 22, 2006", 5 pgs.
"European Application Serial No. 04006851.2, Search Report mailed Aug. 12, 2004", 7 pgs.
"European Application Serial No. 08152167.6, European Extended Search Report issued Oct. 15, 2008".
"European Application Serial No. 08152167.6, Partial European Search Report issued Jul. 29, 2008".
"European Search Report of Application No. EP 04 00 6851 of Aug. 12, 2004", 8 pgs.
"Extended European Search Report, issued Jan. 29, 2008 for EP Application No. 07115678.0".
"Extended European Search Report, issued Feb. 12, 2008, for EP Application No. 07117061".
"Indian Application Serial No. 600/DEL/2005, First Examiner Report mailed May 18, 2011", 2 Pgs.
"Indian Application Serial No. 600/DEL/2005, Response filed Sep. 5, 2011 to Office Action mailed May 18, 2011", 43 pgs.
Originally-filed specification and drawings of U.S. Appl. No. 11/849,433, filed Sep. 4, 2007.
Crocker, S, et al., "MIME Object Security Services", IETF Standard, Internet Engineering Task Force, IETF, (Oct. 1995).
Stallings, W, "S/MIME: E-mail Gets Secure", Byte, McGraw-Hill Inc., St Peterborough, US, vol. 23, No. 7, XP000774260, (Jul. 1, 1998), 41-42.

* cited by examiner

MESSAGE-HANDLING SERVER AND METHOD FOR HANDLING SECURE MESSAGE ATTACHMENTS FOR A MOBILE DEVICE

PRIORITY CLAIM

This application is a continuation of U.S. patent application Ser. No. 13/285,548, filed Oct. 31, 2011, now issued as U.S. Pat. No. 8,607,326, which is a continuation of U.S. patent application Ser. No. 10/805,932, filed on Mar. 22, 2004, now issued as U.S. Pat. No. 8,050,653, all of which are incorporated herein by reference in their entirety.

TECHNICAL FIELD

The present invention relates generally to the field of secure electronic messaging, and in particular to accessing message attachments.

BACKGROUND

Capabilities of wireless mobile communication devices have expanded greatly. For example, such devices not only receive electronic messages, but can view attachments associated with electronic messages. However, difficulties arise when a mobile device wishes to access attachments of secure messages. This is due at least in part to how messages and attachments are structured in order to comport with a security scheme.

SUMMARY

In accordance with the teachings disclosed herein, methods and systems are provided for handling attachments on wireless mobile communication devices. As an example, a method can include receiving an attachment provided with a secure message, wherein the secure message itself was received by the server as an attachment. The secure message is processed in order to locate within the secure message the requested attachment. The located attachment is provided to the mobile device.

In some embodiments, a secure message that includes an attachment is received at a server. The secure message may have a secure layer that indicates that the secure message is at least digitally signed. The secure message may be provided without the attachment to the mobile device over a wireless network. A request may be received from the mobile device to access the attachment. The request may include an attachment identifier (ID) that identifies the attachment in accordance with a message-attachment indexing system. In response to the request to access the attachment, the server may perform an index lookup to find the attachment based upon the attachment ID, may look through the secure layer of the secure message in order to locate the attachment within the secure message, and may render at least an initial portion of the attachment by the server in a format for viewing by the mobile device.

As another example, a system can include a server having a data store that stores a secure message and its associated attachment. The secure message contains a secure layer such that the secure message is received by the server as an attachment itself. A secure message processing module looks into the secure message through the secure layer in order to locate the attachment. The located attachment is provided to the mobile device.

DETAILED DESCRIPTION

The attachment accessing methods and systems disclosed herein may be used with many different types of secure messaging schemes. As an illustration, in a public key cryptography scheme, each user has a key pair including a public key that is distributed or available to other users and a private key that is known only to the user that is the "owner" of the key pair. For secure messaging operations based on public key cryptography, a user uses a private key to decrypt received encrypted messages and to sign messages to be sent. Public keys are used to encrypt messages to be sent and to verify digital signatures on received messages. Thus, access to public keys of other users is required for different secure messaging operations.

Secure messages may be signed with a digital signature, encrypted, or both signed and encrypted, and may also be processed in other ways by a message sender or intermediate system between a message sender and a messaging client which receives the secure message. For example, secure messages include messages that have been signed, encrypted and then signed, or signed and then encrypted, by a message sender according to variants of Secure Multipurpose Internet Mail Extensions (S/MIME). A secure message could similarly be encoded, compressed or otherwise processed either before or after being signed and/or encrypted.

A messaging client allows a system on which it operates to receive and possibly also send messages. Messaging clients operate on a computer system, a handheld device, or any other system or device with communications capabilities. Many messaging clients also have additional non-messaging functions.

Figure 1:
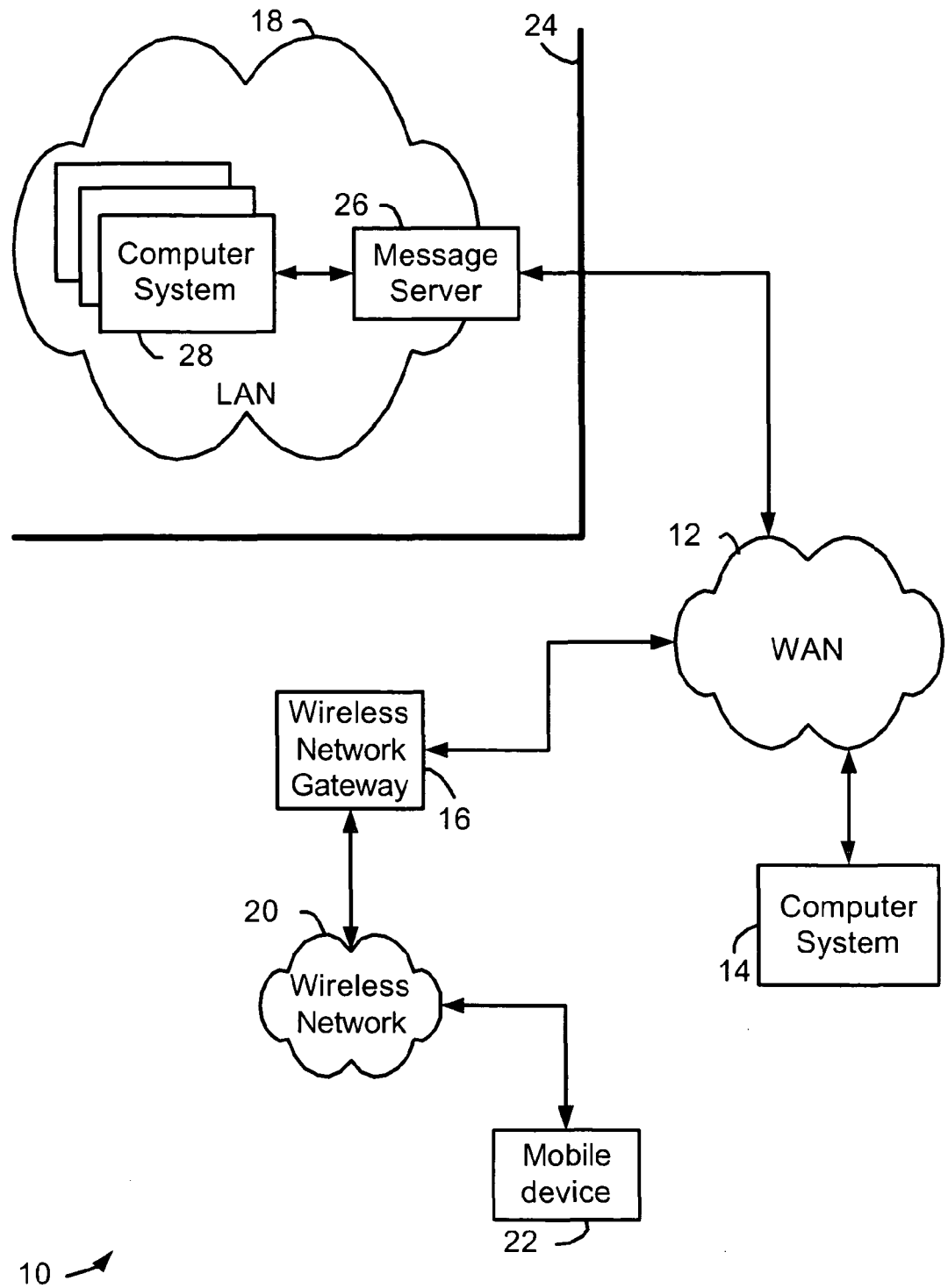
FIG. 1 is a block diagram of a messaging system.

FIG. 1 is a block diagram of a messaging system. The system 10 includes a Wide Area Network (WAN) 12, coupled to a computer system 14, a wireless network gateway 16, and a Local Area Network (LAN) 18 (e.g., a corporate LAN). The wireless network gateway 16 is also coupled to a wireless communication network 20, in which a wireless mobile communication device 22 ("mobile device") is configured to operate.

The computer system 14 is a desktop or laptop personal computer (PC), which is configured to communicate to the WAN 12, which is the Internet in most implementations. PCs, such as computer system 14, normally access the Internet through an Internet Service Provider (ISP), an Application Service Provider (ASP), or the like.

The LAN 18 is a network-based messaging client. It is normally located behind a security firewall 24. Within the LAN 18, a message server 26, operating on a computer behind the firewall 24, serves as the primary interface for the corporation to exchange messages both within the LAN 18, and with other external messaging clients via the WAN 12. Two known message servers 26 are Microsoft™ Exchange server and Lotus Domino™ server. These servers 26 are often used in conjunction with Internet mail routers that route and deliver mail messages. A server such as the message server 26 also typically provides additional functionality, such as dynamic database storage for calendars, to do lists, task lists, e-mail, electronic documentation, etc.

The message server 26 provides messaging capabilities to the corporation's networked computer systems 28 coupled to the LAN 18. A typical LAN 18 includes multiple computer systems 28, each of which implements a messaging client, such as Microsoft Outlook™, Lotus Notes, etc. Within the LAN 18, messages are received by the message server 26, distributed to the appropriate mailboxes for user accounts addressed in the received message, and then accessed by a user through a computer system 28 operating as a messaging client.

The wireless gateway 16 provides an interface to a wireless network 20, through which messages are exchanged with a mobile device 22. Such functions as addressing of the mobile device 22, encoding or otherwise transforming messages for wireless transmission, and any other required interface functions are performed by the wireless gateway 16. Although the wireless gateway 16 operates with the single wireless network 20 in FIG. 1, wireless gateways may be configured to operate with more than one wireless network in alternative embodiments, in which case the wireless gateway may also determine a most likely network for locating a given mobile device user and may also track users as they roam between countries or networks.

Any computer system 14, 28 with access to the WAN 12 may exchange messages with a mobile device 22 through the wireless network gateway 16. Alternatively, private wireless network gateways, such as wireless Virtual Private Network (VPN) routers, could be implemented to provide a private interface to a wireless network. For example, a wireless VPN router implemented in the LAN 18 would provide a private interface from the LAN 18 to one or more mobile devices such as the mobile device 22 through the wireless network 20. Wireless VPN routers and other types of private interfaces to the mobile device 22 may effectively be extended to entities outside the LAN 18 by providing a message forwarding or redirection system that operates with the message server 26. Such a redirection system is disclosed in U.S. Pat. No. 6,219,694, which is hereby incorporated into this application by reference. In this type of redirection system, incoming messages received by the message server 26 and addressed to a user of a mobile device 22 are sent through the wireless network interface, either a wireless VPN router, wireless gateway 16 or other interface, to the wireless network 20 and to the user's mobile device 22. Another alternate interface to a user's mailbox on a message server 26 is a Wireless Application Protocol (WAP) gateway, through which a list of messages in a user's mailbox on the message server 26, and possibly each message or a portion of each message, could be sent to the mobile device 22.

Wireless networks such as the wireless network 20 normally deliver information to and from mobile devices via RF transmissions between base stations and the mobile devices.

The wireless network 20 may, for example, be a data-centric wireless network, a voice-centric wireless network, or a dual-mode network that can support both voice and data communications over the same infrastructure. Known data-centric network include the Mobitex™ Radio Network ("Mobitex"), and the DataTAC™ Radio Network ("DataTAC"). Examples of known voice-centric data networks include Personal Communication Systems (PCS) networks like Global System for Mobile Communications (GSM) and Time Division Multiple Access (TDMA) systems. Dual-mode wireless networks include Code Division Multiple Access (CDMA) networks, General Packet Radio Service (GPRS) networks, and so-called third-generation (3G) networks, such as Enhanced Data rates for Global Evolution (EDGE) and Universal Mobile Telecommunications Systems (UMTS), which are currently under development.

The mobile device 22 is a data communication device, a voice communication device, or a multiple-mode device capable of voice, data and other types of communications. An exemplary mobile device 22 is described in further detail below.

Perhaps the most common type of messaging currently in use is e-mail. In a standard e-mail system, an e-mail message is sent by an e-mail sender, possibly through a message server and/or a service provider system, and is then routed through the Internet, when necessary, to one or more message receivers. E-mail messages are normally sent in the clear and typically use Simple Mail Transfer Protocol (SMTP) headers and Multi-purpose Internet Mail Extensions (MIME) body parts to define the format of the e-mail message.

In recent years, secure messaging techniques have evolved to protect both the content and integrity of messages, such as e-mail messages. S/MIME and Pretty Good Privacy™ (PGP™) are two public key secure e-mail messaging protocols that provide for both encryption, to protect data content, and signing, which protects the integrity of a message and provides for sender authentication by a message receiver. In addition to utilizing digital signatures and possibly encryption, secure messages may also be encoded, compressed or otherwise processed.

Figure 2:
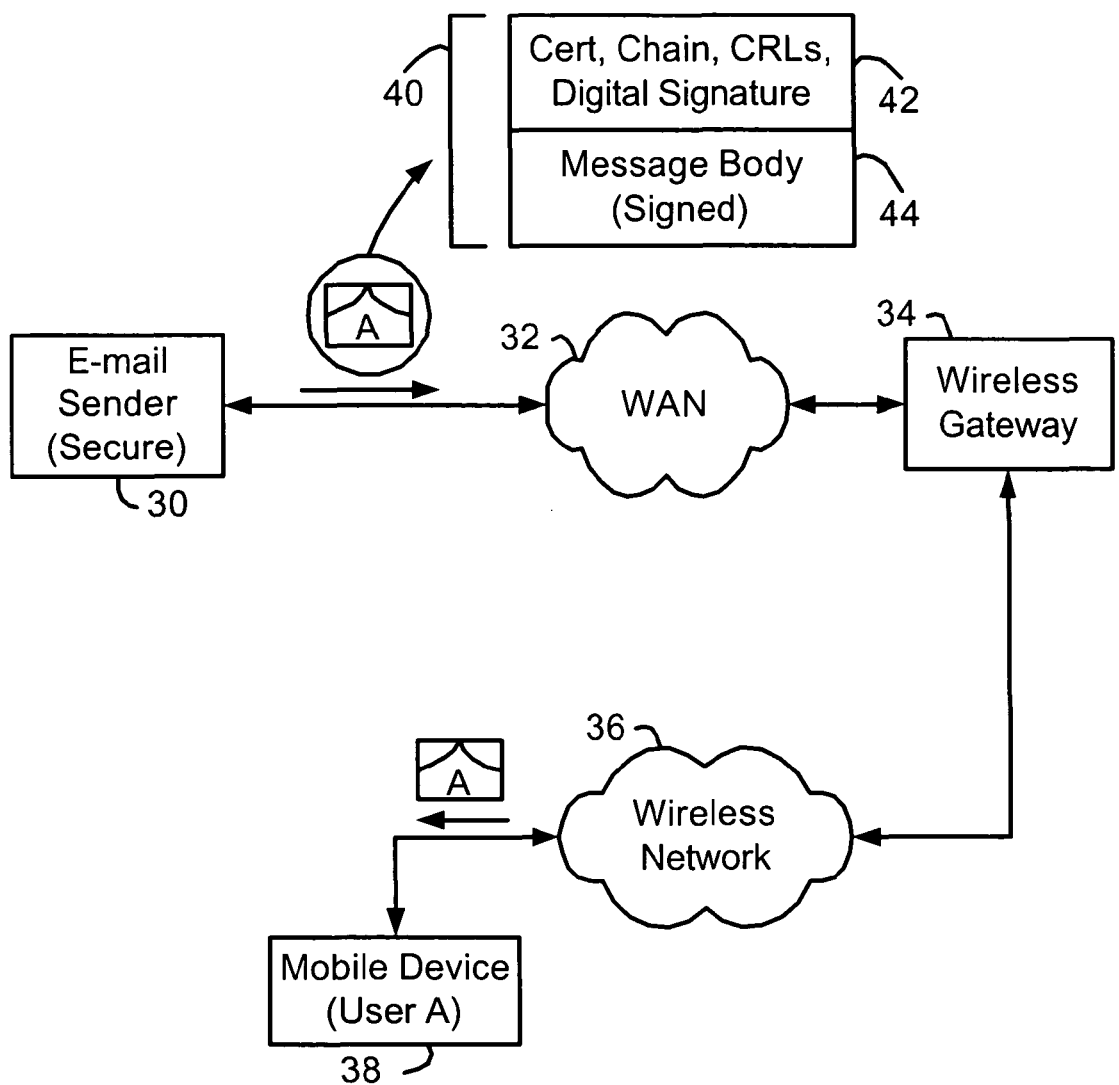
FIG. 2 is a block diagram illustrating a secure e-mail message exchange in a messaging system.

FIG. 2 is a block diagram illustrating a secure e-mail message exchange in a messaging system. The system includes an e-mail sender 30 coupled to a WAN 32, and a wireless gateway 34, which provides an interface between the WAN 32 and a wireless network 36. A mobile device 38 is adapted to operate within the wireless network 36.

The e-mail sender 30 is a PC, such as the system 14 in FIG. 1, a network-connected computer, such as computer 28 in FIG. 1, or a mobile device, on which a messaging client operates to enable e-mail messages to be composed and sent. The WAN 32, wireless gateway 34, wireless network 36 and mobile device 38 are substantially the same as similarly-labelled components in FIG. 1.

In an example digital signature scheme, a secure e-mail message sender 30 digitally signs a message by taking a digest of the message and signing the digest using the sender's private key. A digest may, for example, be generated by performing a check-sum, a Cyclic Redundancy Check (CRC), a hash, or some other non-reversible operation on the message. This digest is then digitally signed by the sender using the sender's private key. The private key is used to perform an encryption or some other transformation operation on the digest to generate a digest signature. A digital signature, including the digest and the digest signature, is then appended to the outgoing message. In addition, a digital Certificate (Cert) of the sender, which includes the sender's public key and sender identity information that is bound to the public key with one or more digital signatures, and possibly any chained Certs and Certificate Revocation Lists (CRLs) associated with the Cert and any chained Certs, is often included with the outgoing message.

The secure e-mail message 40 sent by the e-mail sender 30 includes a component 42 including the sender's Cert, Cert chain, CRLs and digital signature and the signed message body 44. In the S/MIME secure messaging technique, Certs, CRLs and digital signatures are normally placed at the beginning of a message as shown in FIG. 2, and the message body is included in a file attachment. Messages generated by other secure messaging schemes may place message components in a different order than shown or include additional and/or different components. For example, a signed message 40 may include addressing information, such as "To:" and "From:" email addresses, and other header information not shown in FIG. 2.

When the secure e-mail message 40 is sent from the e-mail sender 30, it is routed through the WAN 32 to the wireless gateway 34, through the wireless network 36, and then to the mobile device 38. As described above, an e-mail message sender may alternatively send a message directly to a wireless gateway, to a computer system associated with a mobile device, or to a wireless VPN router or other interface for delivery to a mobile device.

The receiver of the signed message 40, the mobile device 38, typically verifies the digital signature 42 in the secure message 40 by generating a digest of the message body 44, extracting the transmitted digest from the digital signature 42, comparing the generated digest with the digest extracted from the digital signature 42, and then verifying the digest signature in the digital signature. The digest algorithm used by a secure message receiver to generate the generated digest is the same as the algorithm used by the message sender, and is normally specified in a message header, or possibly in a digital signature of the secure message. Commonly used digest algorithm include the Secure Hash Algorithm 1 (SHA1) and Message-Digest Algorithm 5 (MD5), although other digest algorithms may be used. It should be appreciated that the systems and methods described herein are in no way limited to the above, or any other digital signature scheme.

In order to verify the digest signature, the receiver 38 retrieves the public key of the sender 30, generally by extracting the public key from the sender's Cert 42 attached to the message 40, and then verifies the signature on the digest in the digital signature by performing a reverse transformation on the digest signature. For example, if the message sender 30 generated the digest signature by encrypting the digest using its private key, then a receiver 38 uses the sender's public key to decrypt the digest signature to recover the original digest. The secure message 40 shown in FIG. 2 includes the sender's Cert 42, from which the sender's public key can be extracted. Where the sender's public key was extracted from an earlier message from the sender 30 and stored in a key store in the receiver's local store, the sender's public key may instead be retrieved from the local store. Alternatively, the public key may be retrieved from the sender's Cert stored in a local store, or from a Public Key Server (PKS). A PKS is a server that is normally associated with a Certificate Authority (CA) from which a Cert for an entity, including the entity's public key, is available. A PKS might reside within a corporate LAN such as 18 (FIG. 1), or anywhere on the WAN 32, Internet or other network or system through which message receivers may establish communications with the PKS.

The Cert, Cert chain and CRLs 42 are used by a receiver to ensure that the sender's Cert is valid, i.e., that the Cert has not been revoked or expired, and is trusted. A Cert is often part of a Cert chain, which includes a user's Cert as well as other Certs to verify that the user's Cert is authentic. For example, a Cert for any particular entity typically includes the entity's public key and identification information that is bound to the public key with a digital signature. Several types of Cert currently in use include, for example, X.509 Certs, which are typically used in S/MIME, and PGP Certs, which have a slightly different format. The digital signature in a Cert is generated by the issuer of the Cert, and is checked by a message receiver as described above. A Cert may include an expiry time or validity period from which a messaging client determines if the Cert has expired. When a CRL is available, the Cert is checked against the CRL to ensure that the Cert has not been revoked.

If the digital signature in a message sender's Cert is verified, the Cert has not expired or been revoked, and the issuer of the Cert is trusted by a message receiver, then the digital signature of the message is trusted by the message receiver. If the issuer of the Cert is not trusted, then the message receiver traces a certification path through the Cert chain to verify that each Cert in the chain was signed by its issuer, whose Cert is next in the Cert chain, until a Cert is found that was signed by a root Cert from a trusted source, such as a large PKS. Once a root Cert is found, then a signature can be trusted, because both the sender and receiver trust the source of the root Cert.

If a secure message was encrypted or otherwise processed by a message sender after being signed, then each receiver first decrypts or performs other inverse processing operations on the message before signature verification is performed. Where encryption or other processing was performed before signing, however, inverse processing such as decryption is performed after signature verification. Encryption and decryption involve applying a cryptographic key and cipher algorithm to information to be encrypted or decrypted. Encryption and decryption use corresponding cipher algorithms, which may or may not be the same, and either the same or different cryptographic keys. In public key systems, different keys are used for encryption and decryption, whereas in "shared secret" type operations, the same key, a secret shared between a sender and recipient, is used for both encryption and decryption.

Access to a user's public key is also used when an outgoing message addressed to that user is to be encrypted according to a public key encryption algorithm. However, when an error is encountered during a public key access operation, known messaging clients provide little or no information as to the nature of any errors and possible solutions.

Figure 3:
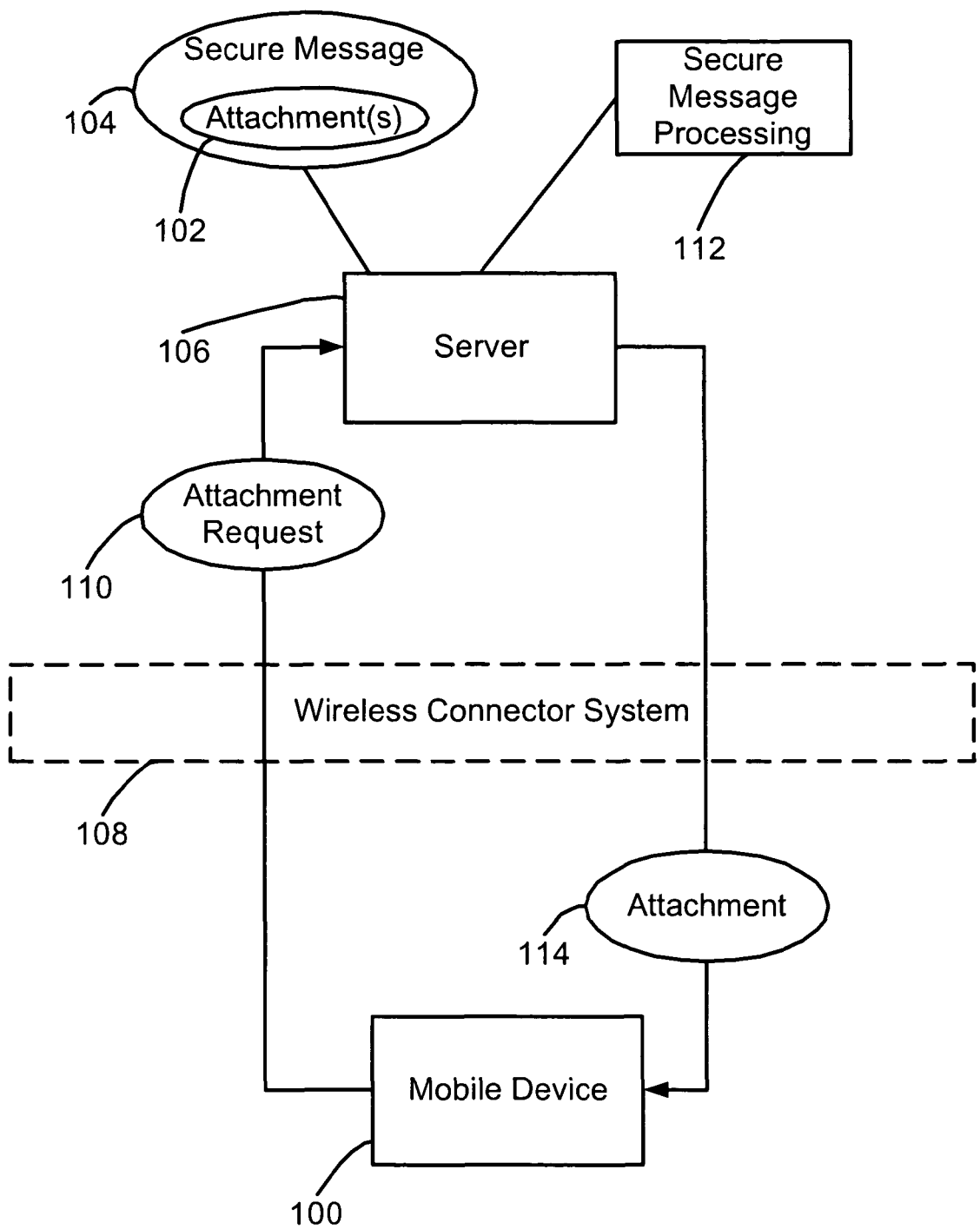
FIG. 3 is a block diagram illustrating a mobile device accessing an attachment.

FIG. 3 illustrates a mobile device 100 wishing to access an attachment 102 that is attached to a secure message 104. In FIG. 3, the secure message scheme used in this example treats the secure message 104 itself as an attachment. As an illustration, when a server 106 receives an S/MIME message 104, the S/MIME message 104 is (at least initially) perceived by the server 106 as an attachment due to how the S/MIME message 104 is structured. Such a scheme may be considered as having an attachment 102 within another attachment (i.e., the secure message 104).

A reason that a secure message 104 appears as an attachment to an e-mail program (e.g., Microsoft Outlook) or to the server 106 is that the message has been enveloped (e.g., encrypted or otherwise protected) with a secure layer. For example, the secure layer can result from the message being encrypted using a random symmetric key, wherein that symmetric key may then be encrypted using the recipient's public key and sent along with the message. If a message is being sent to multiple recipients, the symmetric key is encrypted separately by every recipient's public key. The enveloped message and the encrypted symmetric keys are packaged together and also may be protected via a digital signature.

More specifically, since S/MIME is used to secure MIME entities, a MIME entity that is secured as such can be thought of as the "inside" MIME entity. That is, it is the "innermost" object of a larger MIME message. One or more attachments may be contained within a MIME entity. These aspects are further discussed in RFC 2633 (version 3) entitled "S/MIME Version 3 Message Specification." It should be understood that message security techniques other than S/MIME may be used that result in a secure layer that envelops or wraps message components and which need to be processed by the systems and methods disclosed herein.

An attachment 102 contained within a secure message 104 that a mobile device 100 wishes to obtain may be any type of file, such as a textual/word processing document. The attachment 102 may also be an image, audio or video file.

Because the mobile device 100 is typically resource-limited and in order to save bandwidth, the message server 106 may elect not to initially send the attachment 102 to the mobile device 100 over a wireless connector system 108. While viewing the message on the mobile device 100, a user can request that the message's associated attachment data 102 be transmitted to the mobile device 100 over the wireless connector system 108. It is noted that the wireless connector system 108 may include a wireless network, wireless gateway, and/or wide area network.

The server 106 receives the attachment request 110 and uses the identifying information contained within the attachment request 110 to locate the proper attachment 102. The server 106 contains computer instructions, such as a secure message processing module 112, to look inside the secure message 104 to locate the attachment 102. In order to look inside the secure message 104, decryption operations may need to take place. Location of the attachment 102 within the secure message 104 can be accomplished in many ways, such as by locating a MIME field that contains or is associated with the desired attachment.

Once located, the server 106 sends over the wireless connector system 108 the requested attachment 114 to the mobile device 100. The mobile device 100 can then use the transmitted attachment 114 in any way permitted for the attachment, such as to view the attachment 114 or play an audio attachment.

Figure 4:
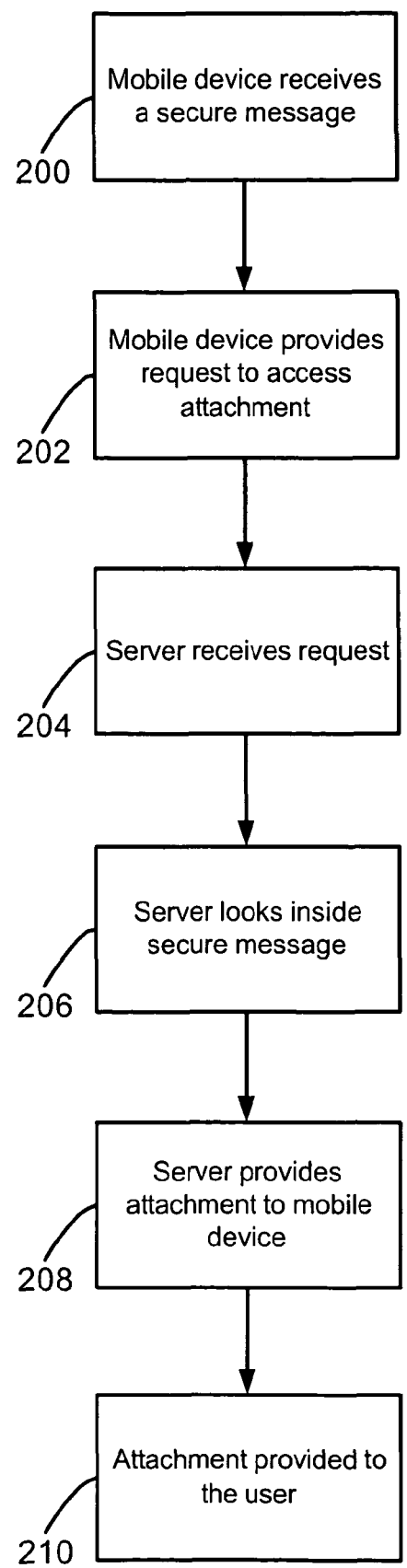
FIG. 4 is a flow chart depicting an operational scenario wherein a mobile device accesses an attachment.

FIG. 4 illustrates an operational scenario wherein a mobile device accesses an attachment. At step 200, a mobile device receives a secure message. If the secure message has one or more attachments, then the mobile device typically displays an icon to the user in order to indicate that an attachment is associated with the message and can be provided to the user. The server may provide an indication to the mobile device that the secure message has an attachment, and the server's indication is used by the mobile device to indicate to the mobile device's user that the secure message has an attachment. Additionally, it should be understood that there may be situations where an attachment is to be provided to a mobile device other than a user indicating a desire to retrieve an attachment. As an illustration, a mobile device may automatically retrieve an attachment based upon the message being opened.

If the attachment is to be retrieved, then at step 202 the mobile device provides a request to have the attachment provided to it. At step 204, the server receives the attachment request. The attachment request may use many different approaches to indicate which attachment(s) the mobile device wishes to receive. For example, the device can specify which attachment it is interested in by using a message attachment indexing system that the device and server both understand. When the user wishes to view an attachment in an S/MIME message, the device sends the appropriate attachment identifier to the server. The server performs an index lookup to find the attachment or the message containing the attachment based upon the identifier.

At step 206, the server processes the secure message encoding and finds the attachment within the secure message. At step 208, the server provides the attachment to the mobile device. The mobile device provides the attachment to the user at step 210. It should be understood that the steps in the flowchart need not necessarily include all of the steps disclosed herein and may include further steps and operations. For example, the server may initially look inside the secure message, such as by decrypting the secure message, to determine whether any attachments are associated with the secure message. The server can provide an indication to the mobile device as to whether the secure message contained any attachments (which indication can then be provided to the user).

Figure 5:
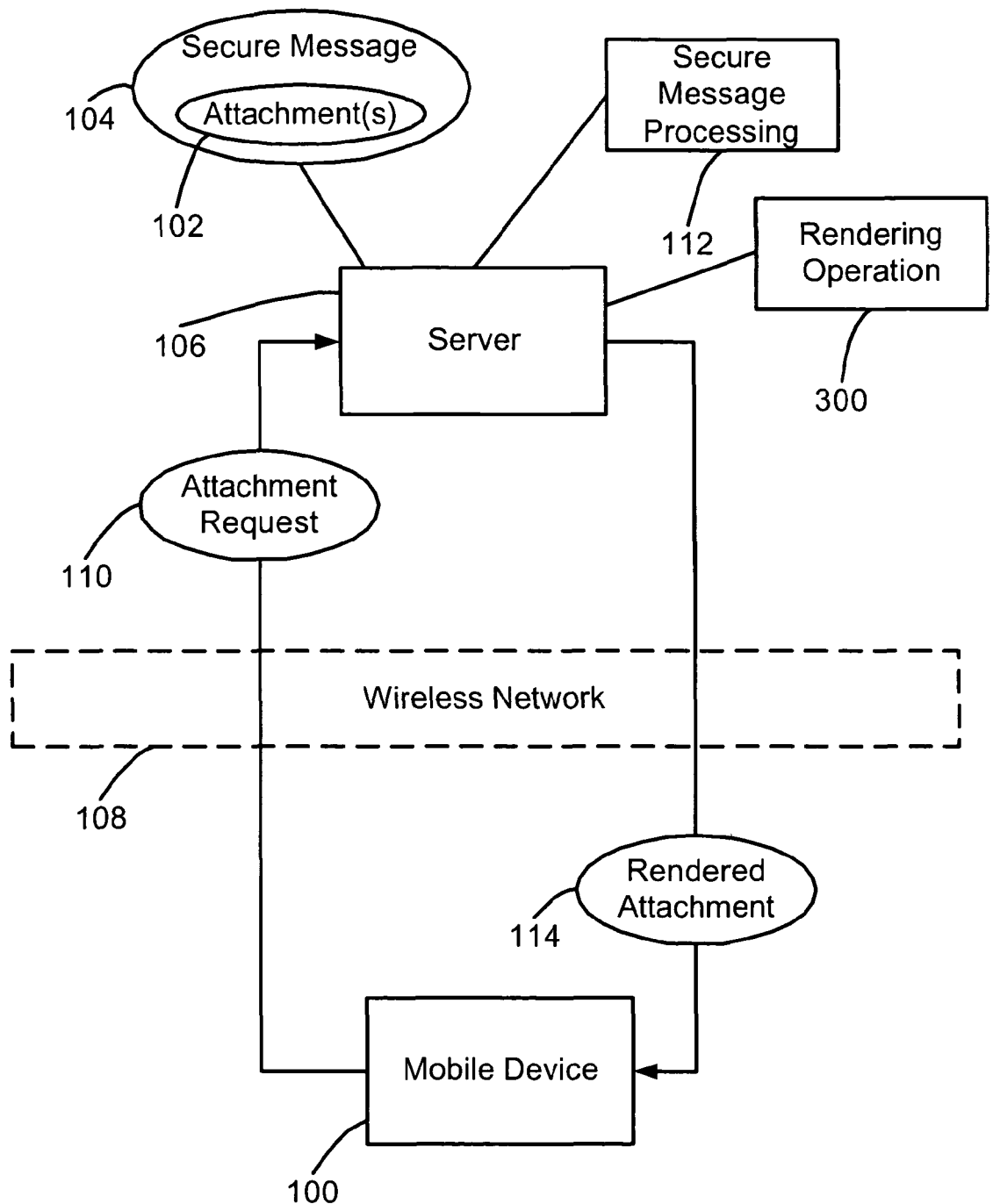
FIG. 5 is a block diagram illustrating a mobile device receiving a rendered attachment.

As another example, the server may render the attachment before transmitting it to the mobile device. As shown in FIG. 5, the server 106 may render the attachment 102 so that the attachment 102 can be more easily viewed (provided that the attachment is of the type that can be viewed by the mobile device). A rendering operation software module 300 accessible by the server 106 can perform the proper rendering of the attachment 102 so that the resource-limited mobile device 100 does not have to perform such operations.

The rendering operation software module 300 renders the attachment 102 so as to be compatible with the attachment viewing software used by the mobile device 100. If needed, module 300 can access a lookup table to determine which format to use to render the attachment 102 for a particular mobile device 100. It should be understood that other approaches may be used, such as the mobile device 100 indicating to the server 106 which format should be used to render the attachment 102, or the server 106 providing attachment viewing software to the mobile device 100 so that the mobile device 100 may view the rendered attachment 114.

The rendered attachment 114 is transmitted to the mobile device 100 and viewed normally on the mobile device 100. The server 106 may transmit all or a portion of the attachment 102. In the situation of the latter, if the mobile device 100 wants to see additional portions of the attachment 102, then the server 106 will send additional portions of the attachment 102 in response to a request by the mobile device 100.

Other operations can be performed with respect to the secure message and its attachment(s). For example, if a message is just signed, then the server can process the secure message encoding and find the attachment. However, if the message is encrypted, then the server uses one or more symmetric/asymmetric keys that are needed to decrypt the secure message.

Figure 6:
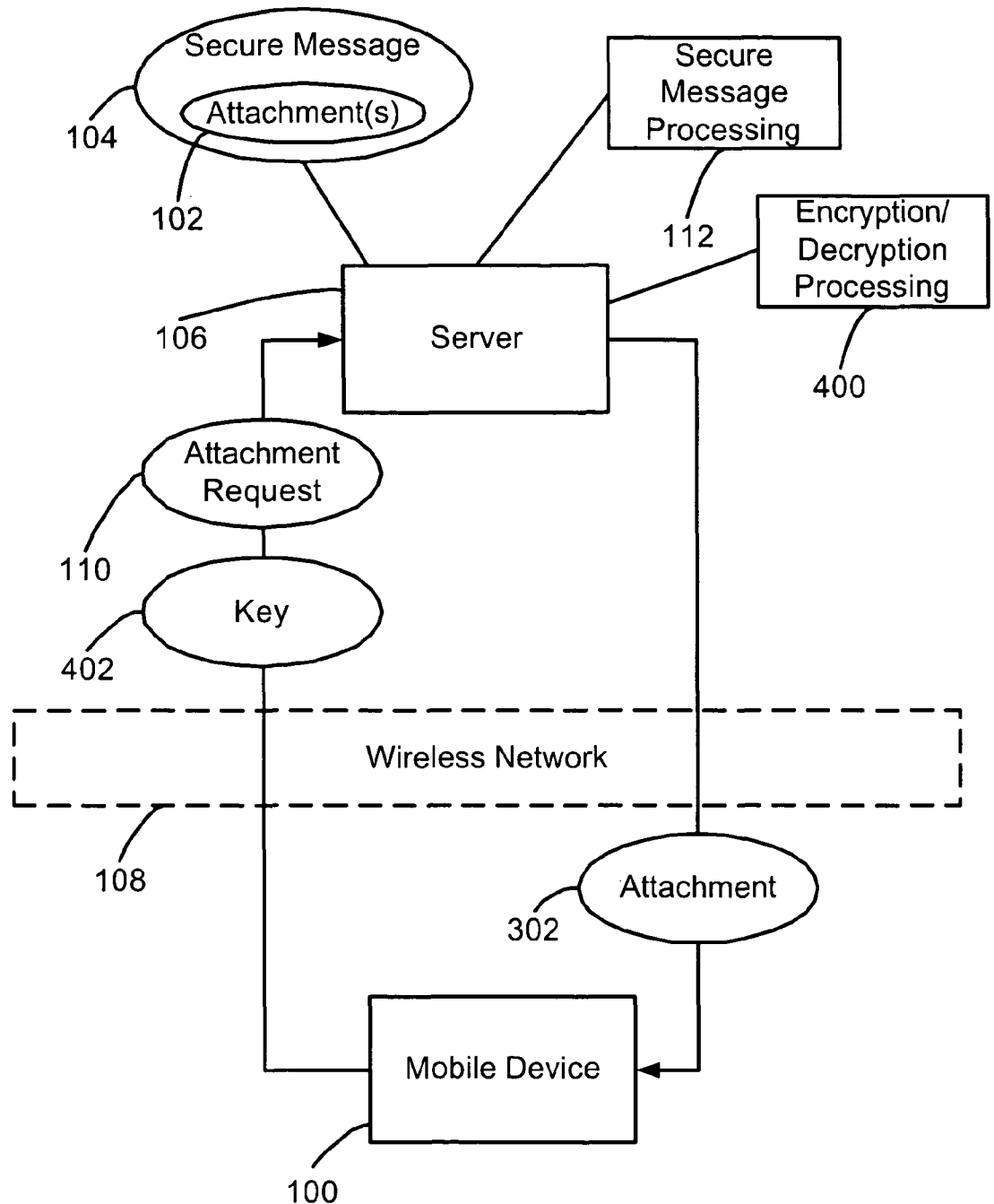
FIG. 6 is a block diagram illustrating a mobile device providing a key to a server for use in accessing an attachment.

As shown in FIG. 6, the mobile device 100 may provide the session key 402 (which was used to encrypt the secure message 104) to the server 106 with the attachment request 110. The server 106 accesses an encryption/decryption processing module 400 to decrypt the secure message 104 using the transmitted session key 402. After the secure message 104 had been decrypted by the module 400, the secure message processing module 112 looks into the secure message 104 and obtains the attachment 102. The attachment 302 is transmitted for use by the mobile device 100. The attachment 302 is optionally rendered as described above before transmission to the mobile device 100.

It will be appreciated that the systems and methods are disclosed by way of example only. Many variations on the systems and methods described above are within the scope of the invention as claimed, whether or not expressly described. For example, the operations disclosed herein may be implemented as the secure message processing module may comprise one or more modules in order to handle a secure message and its attachment(s). Data structures may be used as part of the operations, such as to store data needed to access the attachment contained within a secure message. Still further, data signals transmitted using a communication channel may be used with the systems and methods. The data signals can include any type of data, such as the data and attachments transmitted to and/or from a mobile device. The data signal may be packetized data that is transmitted through a carrier wave or other medium across the network. Computer-readable media may be provided to and used with the mobile device that is capable of causing a mobile device to perform the methods and implement the systems disclosed herein.

Figure 7:
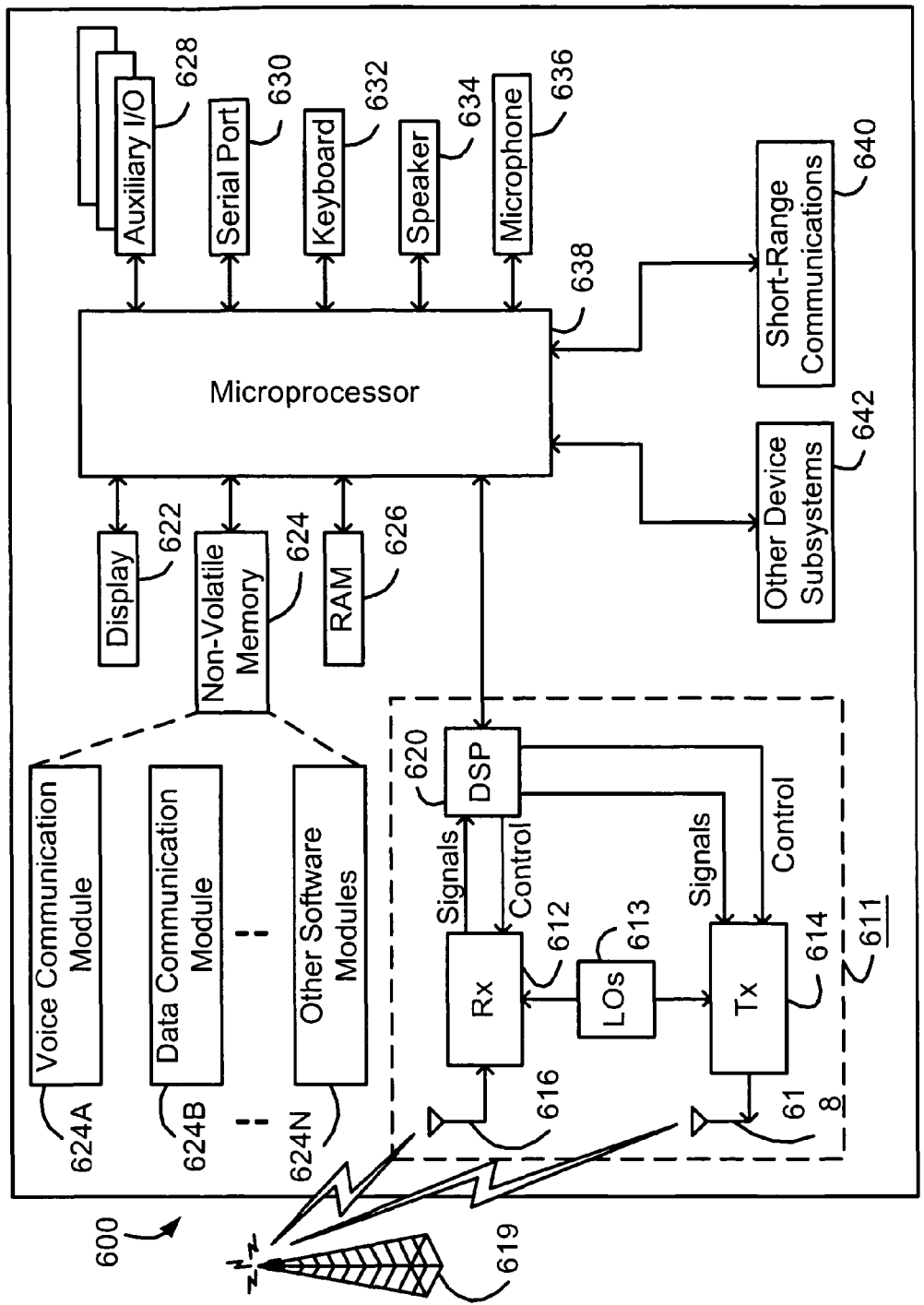
FIG. 7 is a block diagram of a wireless mobile communication device.

As another example, the methods and systems may be used with a wide assortment of electronic devices, such as a personal digital assistant (PDA) device or the mobile device 600 shown in FIG. 7. With reference to FIG. 7, the mobile device 600 is preferably a two-way communication device having at least voice and data communication capabilities. The mobile device 600 preferably has the capability to communicate with other computer systems on the Internet. Depending on the functionality provided by the device, the device may be referred to as a data messaging device, a two-way pager, a cellular telephone with data messaging capabilities, a wireless Internet appliance or a data communication device (with or without telephony capabilities).

The mobile device 600 includes a transceiver 611, a microprocessor 638, a display 622, non-volatile memory 624, RAM 626, auxiliary input/output (I/O) devices 628, a serial port 630, a keyboard 632, a speaker 634, a microphone 636, a short-range wireless communications sub-system 640, and other device sub-systems 642. The transceiver 611 includes transmit and receive antennas 616, 618, a receiver (Rx) 612, a transmitter (Tx) 614, one or more local oscillators (LOs) 613, and a digital signal processor (DSP) 620. Within the non-volatile memory 624, the mobile device 600 includes a plurality of software modules 624A-624N that can be executed by the microprocessor 638 (and/or the DSP 620), including a voice communication module 624A, a data communication module 624B, and a plurality of other operational modules 624N for carrying out a plurality of other functions.

As described above, the mobile device 600 is preferably a two-way communication device having voice and data communication capabilities. Thus, for example, the mobile device 600 may communicate over a voice network, such as any of the analog or digital cellular networks, and may also communicate over a data network. The voice and data networks are depicted in FIG. 7 by the communication tower 619. These voice and data networks may be separate communication networks using separate infrastructure, such as base stations, network controllers, etc., or they may be integrated into a single wireless network.

The communication subsystem 611 is used to communicate with the network 619. The DSP 620 is used to send and receive communication signals to and from the transmitter 614 and receiver 612, and may also exchange control information with the transmitter 614 and receiver 612. If the voice and data communications occur at a single frequency, or closely-spaced set of frequencies, then a single LO 613 may be used in conjunction with the transmitter 614 and receiver 612. Alternatively, if different frequencies are utilized for voice communications versus data communications, then a plurality of LOs 613 can be used to generate a plurality of frequencies corresponding to the network 619. Although two antennas 616, 618 are depicted in FIG. 7, the mobile device 600 could be used with a single antenna structure. Information, which includes both voice and data information, is communicated to and from the communication module 611 via a link between the DSP 620 and the microprocessor 638.

The detailed design of the communication subsystem 611, such as frequency band, component selection, power level, etc., will be dependent upon the communication network 619 in which the mobile device 600 is intended to operate. For example, a mobile device 600 intended to operate in a North American market may include a communication subsystem 611 designed to operate with the Mobitex or DataTAC mobile data communication networks and also designed to operated with any of a variety of voice communication networks, such as AMPS, TDMA, CDMA, PCS, etc., whereas a mobile device 600 intended for use in Europe may be configured to operate with the GPRS data communication network and the GSM voice communication network. Other types of data and voice networks, both separate and integrated, may also be utilized with the mobile device 600.

Depending upon the type of network 619, the access requirements for the dual-mode mobile device 600 may also vary. For example, in the Mobitex and DataTAC data networks, mobile devices are registered on the network using a unique identification number associated with each device. In GPRS data networks, however, network access is associated with a subscriber or user of a mobile device 600. A GPRS device typically requires a subscriber identity module ("SIM"), which is required in order to operate the mobile device 600 on a GPRS network. Local or non-network communication functions (if any) may be operable, without the SIM, but the mobile device 600 will be unable to carry out any functions involving communications over the network 619, other than any legally required operations, such as '911' emergency calling.

After any required network registration or activation procedures have been completed, the mobile device 600 may send and receive communication signals, preferably including both voice and data signals, over the network 619. Signals received by the antenna 616 from the communication network 619 are routed to the receiver 612, which provides for signal amplification, frequency down conversion, filtering, channel selection, etc., and may also provide analog to digital conversion. Analog to digital conversion of the received signal allows more complex communication functions, such as digital demodulation and decoding to be performed using the DSP 620. In a similar manner, signals to be transmitted to the network 619 are processed, including modulation and encoding, for example, by the DSP 620 and are then provided to the transmitter 614 for digital to analog conversion, frequency up conversion, filtering, amplification and transmission to the communication network 619 via the antenna 618. Although a single transceiver 611 is shown in FIG. 7 for both voice and data communications, the mobile device 600 may include two distinct transceivers, a first transceiver for transmitting and receiving voice signals, and a second transceiver for transmitting and receiving data signals.

In addition to processing the communication signals, the DSP 620 also provides for receiver and transmitter control. For example, the gain levels applied to communication signals in the receiver 612 and transmitter 614 may be adaptively controlled through automatic gain control algorithms implemented in the DSP 620. Other transceiver control algorithms could also be implemented in the DSP 620 in order to provide more sophisticated control of the transceiver 611.

The microprocessor 638 preferably manages and controls the overall operation of the mobile device 600. Many types of microprocessors or microcontrollers could be used for this part, or, alternatively, a single DSP 620 could be used to carry out the functions of the microprocessor 638. Low-level communication functions, including at least data and voice communications, are performed through the DSP 620 in the transceiver 611. Other, high-level communication applications, such as a voice communication application 624A, and a data communication application 624B may be stored in the non-volatile memory 624 for execution by the microprocessor 638. For example, the voice communication module 624A may provide a high-level user interface operable to transmit and receive voice calls between the mobile device 600 and a plurality of other voice devices via the network 619. Similarly, the data communication module 624B may provide a high-level user interface operable for sending and receiving data, such as e-mail messages, files, organizer information, short text messages, etc., between the mobile device 600 and a plurality of other data devices via the network 619.

The microprocessor 638 also interacts with other device subsystems, such as the display 622, non-volatile memory 624, random access memory (RAM) 626, auxiliary input/output (I/O) subsystems 628, serial port 630, keyboard 632, speaker 634, microphone 636, a short-range communications subsystem 640 and any other device subsystems generally designated as 642. The components 628, 632, 634 and 636 are examples of the types of subsystems that could be provided as users interfaces. The modules 624A-N are executed by the microprocessor 638 and may provide a high-level interface between a user of the mobile device and the mobile device. This interface typically includes a graphical component provided through the display 622, and an input/output component provided through the auxiliary I/O 628, keyboard 632, speaker 634, or microphone 636.

Some of the subsystems shown in FIG. 7 perform communication-related functions, whereas other subsystems may provide "resident" or on-device functions. Notably, some subsystems, such as keyboard 632 and display 622 may be used for both communication-related functions, such as entering a text message for transmission over a data communication network, and device-resident functions such as a calculator or task list or other PDA type functions.

Operating system software used by the microprocessor 638 is preferably stored in a persistent store such as non-volatile memory 624. In addition to the operating system and communication modules 624A-N, the non-volatile memory 624 may also include a file system for storing data. A storage area is also preferably provided in the non-volatile memory 624 to store public keys, a private key, and other information required for secure messaging. The operating system, specific device applications or modules, or parts thereof, may be temporarily loaded into a volatile store, such as RAM 626 for faster operation. Moreover, received communication signals may also be temporarily stored to RAM 626 before permanently writing them to a file system located in the non-volatile store 624. As those skilled in the art will appreciate, the non-volatile store 624 may be implemented as a Flash memory component or a battery backed-up RAM, for example.

An exemplary application module 624N that may be loaded onto the mobile device 600 is a personal information manager (PIM) application providing PDA functionality, such as calendar events, appointments, and task items. This module 624N may also interact with the voice communication module 624A for managing phone calls, voice mails, etc., and may also interact with the data communication module 624B for managing e-mail communications and other data transmissions. Alternatively, all of the functionality of the voice communication module 624A and the data communication module 624B may be integrated into the PIM module.

The non-volatile memory 624 preferably provides a file system to facilitate storage of PIM data items on the device. The PIM application preferably includes the ability to send and receive data items, either by itself, or in conjunction with the voice and data communication modules 624A, 624B, via the wireless network 619. The PIM data items are preferably seamlessly integrated, synchronized and updated, via the wireless network 619, with a corresponding set of data items stored or associated with a host computer system, thereby creating a mirrored system for data items associated with a particular user.

The mobile device 600 may also be manually synchronized with a host system by placing the mobile device 600 in an interface cradle, which couples the serial port 630 of the mobile device 600 to the serial port of the host system. The serial port 630 may also be used to download other application modules 624N for installation, and to load Certs, keys and other information onto a device. This wired download path may be used to load an encryption key onto the mobile device 600, which is a more secure method than exchanging encryption information via the wireless network 619.

Additional application modules 624N may be loaded onto the mobile device 600 through the network 619, through an auxiliary I/O subsystem 628, through the serial port 630, through the short-range communications subsystem 640, or through any other suitable subsystem 642, and installed by a user in the non-volatile memory 624 or RAM 626. Such flexibility in application installation increases the functionality of the mobile device 600 and may provide enhanced on-device functions, communication-related functions, or both. For example, secure communication applications may enable electronic commerce functions and other such financial transactions to be performed using the mobile device 600.

When the mobile device 600 is operating in a data communication mode, a received signal, such as a text message or a web page download, is processed by the transceiver 611 and provided to the microprocessor 638, which preferably further processes the received signal for output to the display 622, or, alternatively, to an auxiliary I/O device 628. A user of mobile device 600 may also compose data items, such as email messages, using the keyboard 632, which is preferably a complete alphanumeric keyboard laid out in the QWERTY style, although other styles of complete alphanumeric keyboards such as the known DVORAK style may also be used. User input to the mobile device 600 is further enhanced with a plurality of auxiliary I/O devices 628, which may include a thumbwheel input device, a touchpad, a variety of switches, a rocker input switch, etc. The composed data items input by the user may then be transmitted over the communication network 619 via the transceiver 611.

When the mobile device 600 is operating in a voice communication mode, the overall operation of the mobile device 600 is substantially similar to the data mode, except that received signals are preferably output to the speaker 634 and voice signals for transmission are generated by a microphone 636. Alternative voice or audio I/O subsystems, such as a voice message recording subsystem, may also be implemented on the mobile device 600. Although voice or audio signal output is preferably accomplished primarily through the speaker 634, the display 622 may also be used to provide an indication of the identity of a calling party, the duration of a voice call, or other voice call related information. For example, the microprocessor 638, in conjunction with the voice communication module 624A and the operating system software, may detect the caller identification information of an incoming voice call and display it on the display 622.

A short-range communications subsystem 640 is also included in the mobile device 600. For example, the subsystem 640 may include an infrared device and associated circuits and components, or a short-range wireless communication module such as a Bluetooth™ communication module or an 802.11 module to provide for communication with similarly-enabled systems and devices. Those skilled in the art will appreciate that "Bluetooth" and "802.11" refer to sets of specifications, available from the Institute of Electrical and Electronics Engineers (IEEE), relating to wireless personal area networks and wireless LANs, respectively.

What is claimed is:

1. A method performed by a server for handling secure message attachments for a mobile device, the method comprising:
   receiving a secure message that includes an attachment, the secure message having a secure layer that indicates that the secure message is digitally signed, wherein the attachment is also secured within the secure message, and wherein the secure message is structured according to a security scheme such that the secure message is handled as an attachment by the server;
   storing the secure message with the first attachment comprised therein at the server;
   generating a version of the secure message to send to the mobile device, the generating comprising
      processing an encoding of the secure message to identify the attachment, and
      removing the attachment from the secure message;
   providing the generated version of the secure message, as an attachment, over a secure connection to the mobile device;
   receiving a request to access the attachment from the mobile device;
   retrieving the attachment based on the encoded secure message in response to receiving the request; and
   after the attachment has been retrieved, providing the attachment to the mobile device over the secure connection.

2. The method of claim 1 wherein the secure connection is a virtual-private network (VPN) connection.

3. The method of claim 1 further comprising:
   rendering the attachment by the server in a format for viewing by the mobile device for transmission over the secure connection.

4. The method of claim 3 wherein rendering comprises:
   rendering an initial portion of the attachment by the server in the format for viewing by the mobile device for an initial transmission over the secure connection; and
   rendering an additional portion of the attachment by the server in the format for viewing by the mobile device for subsequent transmission over the secure connection.

5. The method of claim 3 further comprising selecting the format by the server to be compatible for viewing on the mobile device based on characteristics of the mobile device.

6. The method of claim 1 wherein providing the secure message comprises:
   rendering an initial portion of the secure message by the server in the format for viewing by the mobile device for an initial transmission to the mobile device; and
   rendering an additional portion of the secure message by the server in the format for viewing by the mobile device for subsequent transmission to the mobile device.

7. The method of claim 1 wherein the security scheme is a Secure Multipurpose Internet Mail Extensions (S/MIME) scheme.

8. The method of claim 1 wherein the attachment comprises at least one of a textual document, word processing document, audio file, image file, and video file.

9. The method of claim 1 wherein the request includes an attachment identifier (ID) that identifies the attachment in accordance with a message-attachment indexing system, and
   wherein the method includes the server performing an index lookup to find the attachment based upon the attachment ID.

10. The method of claim 1, wherein the secure message has a plurality of attachments, each having an attachment ID,
   wherein the request includes one or more of the attachment IDs.

11. The server of claim 1 wherein the secure message has a plurality of attachments, each having an attachment ID,
   wherein the request includes one or more of the attachment IDs.

12. A server arranged for handling secure message attachments for mobile devices, the server having network interface circuitry arranged to:
   receive a secure message that includes attachment, the secure message having a secure layer that indicates that the secure message is digitally signed, wherein the attachment is also secured within the secure message, and wherein the secure message is structured according to a security scheme such that the secure message is handled as an attachment by the server;
   store the secure message with the attachment comprised therein at the server;
   generate a version of the secure message to send to the mobile device, the version of the secure messaging being generated by
      processing an encoding of the secure message to identify the attachment, and
      removing the attachment from the secure message;
   provide the generated version of the secure message, as an attachment, over a secure connection to the mobile device;
   receive a request to access the attachment from the mobile device;
   retrieve the attachment based on the encoded secure message in response to receiving the request; and
   after the attachment has been retrieved, provide the attachment to the mobile device over the secure connection in response to the request to access the attachment from the mobile device.

13. The server of claim 12 wherein the secure connection is a virtual-private network (VPN) connection.

14. The server of claim 13 further configured to:
   render the attachment by the server in a format for viewing by the mobile device for transmission over the secure connection.

15. The server of claim 14 wherein to render the attachment, the server is configured to:
   render an initial portion of the attachment in the format for viewing by the mobile device for an initial transmission over the secure connection; and
   render an additional portion of the attachment in the format for viewing by the mobile device for subsequent transmission over the secure connection.

16. The server of claim 14 wherein the format is selected by the server to be compatible for viewing on the mobile device based on characteristics of the mobile device.

17. The server of claim 12 wherein to provide the secure message, the server is further configured to:
- render an initial portion of the secure message in the format for viewing by the mobile device for an initial transmission to the mobile device; and
- render an additional portion of the secure message in the format for viewing by the mobile device for subsequent transmission to the mobile device.

18. The server of claim 12 wherein the security scheme is a Secure Multipurpose Internet Mail Extensions (S/MIME) scheme.

19. The server of claim 12 wherein the attachment comprises at least one of a textual document, word processing document, audio file, image file, and video file.

20. The server of claim 12 wherein the request includes an attachment identifier (ID) that identifies the attachment in accordance with a message-attachment indexing system, and
- wherein the server is further arranged to perform an index lookup to find the attachment based upon the attachment ID.

21. A non-transitory computer-readable storage medium that stores instructions for execution by one or more processors of a server to perform operations for handling secure message attachments for mobile devices, the operations comprising:
- receiving a secure message that includes attachment, the secure message having a secure layer that indicates that the secure message is digitally signed, wherein the attachment is also secured within the secure message, and wherein the secure message is structured according to a security scheme such that the secure message is handled as an attachment by the server;
- processing an encoding of the secure message to identify the attachment;
- removing the attachment from the secure message based on processing the encoding;
- after the attachment has been removed, providing the secure message, as an attachment, over a secure connection to the mobile device;
- providing an indication to the mobile device that the secure message comprises the attachment available at the server, the indication being provided separate from the secure message; and
- after the indication has been provided to the mobile device, providing the attachment to the mobile device over the secure connection in response to a request to access the attachment from the mobile device, wherein providing the attachment comprises:
- retrieving the attachment based on the encoded secure message in response to receiving the request.

* * * * *